(12) United States Patent
Ma et al.

(10) Patent No.: US 10,843,571 B2
(45) Date of Patent: Nov. 24, 2020

(54) REPAIRABLE SLIDING PLATE OF PANTOGRAPH OF ELECTRIC LOCOMOTIVE AND METHOD FOR MAKING THE SAME

(71) Applicant: Army Academy of Armored Forces, Beijing (CN)

(72) Inventors: Guozheng Ma, Beijing (CN); Haidou Wang, Beijing (CN); Yiwen Wang, Beijing (CN); Pengfei He, Beijing (CN); Shuying Chen, Beijing (CN); Ming Liu, Beijing (CN); Zhiguo Xing, Beijing (CN); Haijun Wang, Beijing (CN); Binshi Xu, Beijing (CN)

(73) Assignee: ARMY ACADEMY OF ARMORED FORCES, Beijing (CN)

( * ) Notice: Subject to any disclaimer, the term of this patent is extended or adjusted under 35 U.S.C. 154(b) by 41 days.

(21) Appl. No.: 16/038,549

(22) Filed: Jul. 18, 2018

(65) Prior Publication Data

US 2019/0126758 A1    May 2, 2019

(30) Foreign Application Priority Data

Oct. 27, 2017    (CN) .......................... 2017 1 1023841

(51) Int. Cl.
*C23C 4/123*    (2016.01)
*C23C 4/18*    (2006.01)
(Continued)

(52) U.S. Cl.
CPC ................ *B60L 5/205* (2013.01); *C23C 4/02* (2013.01); *C23C 4/06* (2013.01); *C23C 4/067* (2016.01);
(Continued)

(58) Field of Classification Search
CPC ........ B60L 5/205; B60L 2200/26; B60L 5/20; C23C 4/02; C23C 4/067; C23C 4/06; C23C 4/123; C23C 4/18; C23C 4/134
See application file for complete search history.

(56) References Cited

U.S. PATENT DOCUMENTS

2013/0106349 A1* 5/2013 Tuyeras .................. B60L 5/205
                                                            320/109

FOREIGN PATENT DOCUMENTS

CN        105714235 A       6/2016
CN        106735176 A   *   5/2017
(Continued)

OTHER PUBLICATIONS

Bib Data and translation; JP-2003324805-A; Nov. 2003; Okazaki, Zenji (Year: 2003).*

(Continued)

*Primary Examiner* — Humera N. Sheikh
*Assistant Examiner* — Elizabeth D Ivey
(74) *Attorney, Agent, or Firm* — Crain Caton and James (57) ABSTRACT

The present disclosure relates to a novel high-performance repairable sliding plate of a pantograph of an electric locomotive and a manufacturing method thereof. The sliding plate includes a monometallic substrate and a conductive, wear-resistant, anticorrosion and self-lubricating coating integrated with the substrate. The coating is formed by plasma spraying Cu—TiO$_2$ core-shell composite powder on the monometallic substrate directly, and includes the following components by mass percent: 60-70% of Ti$_4$O$_7$, 15-25% of Cu, 10-15% of Ti$_x$O$_{(2x-1)}$ and 5-10% of TiO$_2$, where 5≤x≤10. The multifunctional composite coating is the working layer of the sliding plate of the present disclosure, and the damage of the coating can be repaired by plasma (Continued)

spraying with the composite powder, thereby recovering dimensional accuracy and service performance.

19 Claims, 5 Drawing Sheets

(51) Int. Cl.
　　　*C23C 4/134*　　　(2016.01)
　　　*C23C 4/02*　　　(2006.01)
　　　*B60L 5/20*　　　(2006.01)
　　　*C23C 4/06*　　　(2016.01)
　　　*C23C 4/067*　　　(2016.01)
(52) U.S. Cl.
　　　CPC .............. *C23C 4/123* (2016.01); *C23C 4/134* (2016.01); *C23C 4/18* (2013.01); *B60L 2200/26* (2013.01)

(56) References Cited

FOREIGN PATENT DOCUMENTS

| | | | |
|---|---|---|---|
| CN | 106735176 A | | 5/2017 |
| JP | S62163501 A | | 7/1987 |
| JP | 2003324805 A | * | 11/2003 |

OTHER PUBLICATIONS

Bib Data and translation; CN 106735176; May 31, 2017; Chen Yike (Year: 2017).*

* cited by examiner

REPAIRABLE SLIDING PLATE OF PANTOGRAPH OF ELECTRIC LOCOMOTIVE AND METHOD FOR MAKING THE SAME

CROSS-REFERENCES TO RELATED APPLICATIONS

This application claims priority to Chinese patent application No. CN201711023841.4, filed on Oct. 27, 2017, the disclosure of which is incorporated herein by reference in its entirety.

TECHNICAL FIELD

The present disclosure relates to the field of the pantograph of the electric locomotive, and particularly relates to a repairable sliding plate of a pantograph of an electronic locomotive and a method for making the sliding plate.

BACKGROUND

A pantograph is a collective name of devices that enable an electrified vehicle to obtain electrical power from an overhead bare trolley line (such as a train or tram power line). A sliding plate of the pantograph, which is an important part of the pantograph, is fixed at a top end of a pantograph arm through a conductive adhesive or a mechanical lock, and comes into direct contact with the trolley line of a contact net. In an operation process of an electric locomotive, the sliding plate of the pantograph is slid on the trolley line of the contact net, and obtains current from the trolley line to provide power for the locomotive. Therefore, the sliding plate of the pantograph is an important element of the electric locomotive for obtaining power. The quality of the sliding plate has a direct influence on power supply of the electric locomotive and normal effective operation of the motor of the electric locomotive, and thus is a critical factor regarding the safe operation of the locomotive.

The sliding plate is exposed in a natural environment for a long time, and often works in severe weather such as alternation between wet and dry weather, dust environment, raining environment, snowing environment, and extreme temperatures, so the sliding plate is the most frequently replaced and consumed component in the electric locomotive. When the electric locomotive is running with a high speed, the sliding plate obtains the current from the trolley line of the contact net, the sliding plate and the trolley line are mechanically and electrically coupled and form a special friction pairing. This friction pairing has two kinds of wear: mechanical wear and electrical wear. To meet working conditions, the sliding plate generally should meet the following performance requirements: good conductivity, impact resistance, anti-friction property and wear resistance, high mechanical strength, adaptability to a severe natural environment and the like.

The sliding plates are mainly classified into metal sliding plates and carbon sliding plates according to materials. The metal sliding plate has excellent conductive performance, but the material of the metal sliding plate is similar to that of the trolley line of the contact net, so the metal sliding plate has strong affinity, and is prone to adhesive wear, causing serious wear of the trolley line of the contact net and the sliding plate. The metal sliding plate has been eliminated currently. Powder metallurgy sliding plates are classified into iron-based sliding plates and copper-based sliding plates. Since a substrate of the powder metallurgy sliding plate is still metal which is similar to that of a copper-magnesium alloy trolley line of the contact net, the powder metallurgy slide and the contact wire suffer serious wear. The carbon sliding plate has good self-lubricating property and small wear with respect to the trolley line of contact net, but the carbon sliding plate has low mechanical strength, is prone to be fractured and broken. Further, the carbon sliding plate has a large intrinsic resistance, which may produce a high temperature causing the oxidation of the trolley line. The existing sliding plate of the pantograph could not achieve high conductivity and high wear resistance simultaneously. Moreover, the worn sliding plate could not be repaired, and needs to be replaced even if the surface of the sliding plate is worn, and the damaged sliding plate is usually scraped directly, which causes a huge waste to resources.

The existing sliding plate mainly has the following problems. Firstly, the powder metallurgy sliding plates are classified into the copper-based sliding plates and the iron-based sliding plates, both of which have good mechanical strength and good conductivity, but the sliding plate having high copper content has good affinity with a hard copper trolley line, which easily causes the adhesion between the pantograph and the trolley line of the contact net and a serious wear of the trolley line of the contact net. The surface hardness of the iron-based powder metallurgy sliding plate is far higher than the hardness of a copper wire. Even if the lubrication effect is good, the wear of the trolley line of the contact net is also relatively serious. Secondly, the metal-impregnated carbon sliding plate has a low mechanical strength and a relatively poor impact toughness, is easy to be broken when the electric locomotive is running at a high speed and the metal-impregnated carbon sliding plate works with a hard trolley line, and may be fractured in a severe case. Therefore, the carbon sliding plate has a low service life, is prone to be seriously worn during use and is easy to suffer local strain. Moreover, in a rainy season and a humid region, due to the increase of a friction force, the possibility of pantograph-catenary fault is increased. Thirdly, the powder metallurgical alloy sliding plate has poor corrosion resistance. The sliding plate of the pantograph for a high-speed railway has a bad working environment, and is easily corroded due to moisture, chemical gas, saline substances and the like in atmosphere. When the air humidity is relatively high, the surface moisture of the sliding plate may be condensed into a water film; and $O_2$ and $CO_2$ as well as other gas such as $H_2S$, $SO_2$ and $Cl_2$ in the atmosphere are easily dissolved in the water film to form an electrolyte film. Due to the potential difference between metal electrodes, electrochemical corrosion may occur. Fourthly, the existing carbon sliding plate is prepared by raw material mixing, cold pressing, hot pressing, pressurizing and curing, roasting and high-temperature graphitizing and many other processes, causing complicated process and many flow steps. The product process is time-consuming and labor-consuming, and the production efficiency is low. Fifthly, the existing sliding plate with good performance has relatively high production cost. On one hand, the production process is complicated and difficult, causing a high price of the sliding plate. On the other hand, due to the scarcity of copper resources, the copper material is expensive, thereby increasing the material cost. Sixthly, currently, the service life of the sliding plate is relatively short. When the sliding plate is damaged or the performance thereof is degraded, the damaged or performance—degraded sliding plate is directly replaced, and the damaged sliding plate could not be recycled and maintained or remanufactured, thereby causing the huge waste to resources.

With regard to the above problems, researchers in the world propose a series of solutions. For example, Chinese patent literature CN105543534A discloses a copper-based sliding plate material, including by mass percent: 58%-86% of Cu, 3%-10% of Fe, 1%-5% of Cr, 1%-5% of Ni, 2%-5% of Zn, 5%-10% of Sn, 1%-5% of Pb and 1%-2% of graphite. The copper-based sliding plate material has high strength and low frictional wear. Chinese patent literature CN106191497A discloses an application method of a copper-based sliding plate composite material. A ceramic body is prepared using graphite powder, titanium powder, aluminum powder and other substances as the raw material. The ceramic body is sintered at a high temperature and is subjected to ball milling with the pretreated graphite and copper powder to obtain composite material powder. Finally, the composite material powder is pressed, sintered and polished to obtain the copper-based sliding plate composite material. The wear for the trolley line caused by the obtained copper-based sliding plate is small, and the wear of the copper-based sliding plate is relatively small. Chinese patent literature CN105272254A discloses an application method of a carbon sliding plate material, including kneading, molding, primary roasting, impregnating and secondary roasting. During the kneading process, an aggregate is electrolytic graphene with a particle size of 30-45 nm, semi-reinforced carbon black with a particle size of 40-55 nm and needle-like petroleum coke. The binder is mid-temperature pitch. The impregnant is impregnating pitch. The particle size of the electrolytic graphene is preferably 35-45 nm; and the particle size of the semi-reinforced carbon black is preferably 50-65 nm.

In addition, some researchers improve the structure of the sliding plate. For example, Chinese patent literature CN105819858A discloses an application method of a carbon slider of a pantograph, including steps of pulverizing, kneading into paste, flaking, heating and pressing, roasting, cooling and discharging, and molding. The high-performance carbon slider may be manufactured. RU201115349A improves the existing pantograph The pantograph is installed on a mobile frame made of a hollow pipe. The hollow pipe is filled with porous conductive material, thereby reducing the weight of the pantograph, improving longitudinal and transverse rigidity and achieving higher reliability.

The above-mentioned patents improve the conductivity, impact strength and other properties of the sliding plate with different methods, but the improvements are still on the basis of the existing sliding plate, and the metal-based sliding plate still causes a serious wear to the contact wires. The carbon sliding plate also could not solve the problems of breaking and residue falling caused by the soft carbon material. Therefore, the performance of the sliding plate could not be improved fundamentally.

SUMMARY

In view of the above problems, the present disclosure provides a novel high-performance repairable sliding plate of a pantograph of an electric locomotive and a method for making the sliding plate. By forming a $Cu-Ti_nO_{(2n-1)}$ composite coating on a surface of a monometallic sliding plate, the wear resistance and corrosion resistance of the sliding plate are improved, and the service life of the sliding plate is prolonged. Moreover, the conductivity of the sliding plate is improved, and a remanufacturing characteristic is endowed to the sliding plate, thereby reducing production cost and being applicable to the industrialized application.

To achieve the purpose, the present disclosure adopts the following technical solutions.

In a first aspect, the present disclosure provides a sliding plate of a pantograph. The sliding plate includes a $Cu-Ti_nO_{(2n-1)}$ composite coating, a substrate, and a base, where $4 \leq n \leq 10$. The $Cu-Ti_nO_{(2n-1)}$ composite coating is formed on a surface of the substrate, and the substrate is mounted on the base.

In a second aspect, the present disclosure provides a method for making the sliding plate mentioned in the first aspect. The method includes the following steps:

preparing a composite coating on a surface of a substrate through plasma spraying with $Cu-TiO_2$ core-shell composite powder; and mounting the substrate coated with the composite coating on a seat.

Compared with the existing art, the present disclosure at least has the following beneficial effects.

In the present disclosure, the $Cu-Ti_nO_{(2n-1)}$ composite coating ($4 \leq n \leq 10$) is formed on the monometallic sliding plate, the main component $Ti_4O_7$ of the $Cu-Ti_nO_{(2n-1)}$ composite coating is a ceramic. The content of Cu is low and Cu does not cause metal adhesion with the trolley line made from hard copper, and thus, the wear for the trolley line is relatively small. The ceramic material $Ti_4O_7$ in the coating has high mechanical strength, good anti-friction property and good wear resistance and is difficult to be broken when rubbing with the trolley line. The wear of the sliding plate is also relatively small, thereby prolonging the service life of the sliding plate.

The composite coating provided by the present disclosure has excellent corrosion resistance. The ceramic material $Ti_4O_7$ has good electrochemical stability, is very stable in a strong acid and alkali environment, and is not easily corroded during operation. Meanwhile, the composite coating is sprayed on the surface of the metal substrate to isolate the substrate from an external environment. The sliding plate with such structure can prevent the metal substrate from being corroded in an atmospheric environment, thereby protecting the substrate and prolonging the service life of the sliding plate.

During the use of the sliding plate provided by the present disclosure, contact friction is present between the composite coating and the trolley line. However, the substrate is not worn. After the sliding plate reaches the service life, the sliding plate can be recycled and remanufactured. The sliding plate is re-sprayed with the plasma spraying method to repair the coating on the surface of the sliding plate. The remanufactured sliding plate has consistent performance with a new sliding plate, thereby effectively saving resources and greatly reducing production cost.

$Ti_4O_7$ in the composite coating obtained by the present disclosure has metal-like high conductivity. By adding the conductive metal Cu, the conductivity of the coating is substantially improved, and the resistivity of the coating is 4-8 $\mu\Omega$, thereby guaranteeing a good current feeding for a trolley bus.

With the plasma spraying, the substrate is directly sprayed with the $Cu-TiO_2$ core-shell powder prepared by the present disclosure, and the $Cu-Ti_nO_{(2n-1)}$ composite coating ($4 \leq n \leq 10$) is generated in situ, with no need for additional process flows. Therefore, the process of the $Cu-Ti_nO_{(2n-1)}$ composite coating is simple, and meanwhile, a plurality of sliding plates could be sprayed in one batch at the same time. Therefore, the production efficiency is high.

In the present disclosure, the material used in plasma spraying is Cu—$TiO_2$ powder. The main composition is $TiO_2$ which is abundant in the world, while the content of Cu in the powder is low, thereby saving the resources and also reducing the cost of the raw material. The plasma spraying method is adopted in the method for making the sliding plate. Therefore, the process is simple, and the production cost is low.

The present disclosure is further described in detail below. But the following embodiments are only exemplary examples of the present disclosure, and do not represent or limit a protection scope of claims of the present disclosure. The protection scope of the present disclosure depends on the claims.

DETAILED DESCRIPTION

The technical solution of the present disclosure is further described below in conjunction with the specific embodiments and drawings.

To describe the present disclosure better and facilitate the understanding of the technical solution of the present disclosure, the typical but non-limiting embodiments of the present disclosure are as follows.

Figure 1:
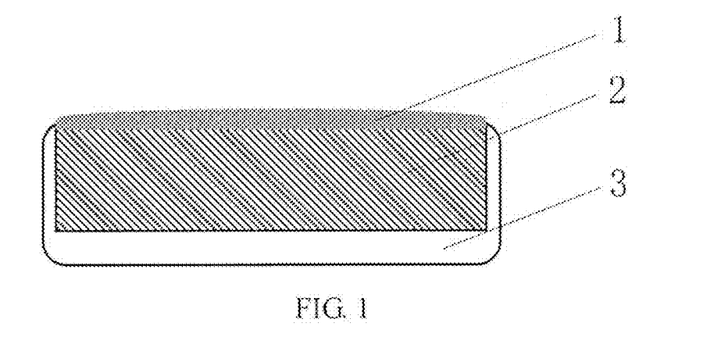
FIG. 1 is a cross-sectional view of a sliding plate of a pantograph prepared by a method according to the present disclosure.

An embodiment of the present disclosure provides a sliding plate of a pantograph. The sliding plate includes a seat 3, a substrate 2 mounted on the seat 3; and a Cu—$Ti_nO_{(2n-1)}$ composite coating 1 formed on a surface of the substrate 2, where n is greater than or equal to 4 and less than or equal to 10.

The Cu—$Ti_nO_{(2n-1)}$ composite coating includes the following components by mass percent: 60%-70% of $Ti_4O_7$, 15%-25% of Cu, 10%-15% of $Ti_xO_{(2x-1)}$ and 5%-10% of $TiO_2$, where x is greater than or equal to 5 and less than or equal to 10.

The substrate is a monometallic substrate. In one or more embodiment, the substrate is copper. In another embodiment, the substrate is iron.

In an exemplary embodiment, in the Cu—$Ti_nO_{(2n-1)}$ composite coating, n is not less than 4 and not more than 10. For example, n may be 4, 5, 6, 7, 8, 9 or 10. For the sake of the space and conciseness, the present invention does not enumerate the values endlessly.

In an exemplary embodiment, by mass percent, the Cu—$Ti_nO_{(2n-1)}$ composite coating includes: 60 wt %-70 wt % of $Ti_4O_7$; 15 wt %-25 wt % of Cu; 10 wt %-15 wt % of Cu—$Ti_nO_{(2n-1)}$ and 5 wt %-10 wt % of $TiO_2$; where $5 \leq x \leq 10$.

In an exemplary embodiment, the amount of the $Ti_4O_7$ in the composite coating is of 60% to 70% expressed as a percent by mass based on the total mass of the composite coating. For example, the amount of the $Ti_4O_7$ in the composite coating may be of 60%, 61%, 62%, 63%, 64%, 65%, 66%, 67%, 68%, 69% or 70%, and a specific value between 60% and 70%. For the sake of the space and conciseness, the present disclosure does not enumerate the values endlessly.

In an exemplary embodiment, the amount of the Cu in the composite coating is of 15% to 25% expressed as a percent by mass based on the total mass of the composite coating. For example, the content of Cu may be 15%, 16%, 17%, 18%, 19%, 20%, 21%, 22%, 23%, 24% or 25%, and a specific value between 15% and 25%. For the sake of the space and conciseness, the present disclosure does not enumerate the values endlessly.

In an exemplary embodiment, by mass percentage, the amount of the Cu—$Ti_nO_{(2n-1)}$ in the composite coating is of 10% to 15% expressed as a percent by mass based on the total mass of the composite coating. For example, the content of $Ti_xO_{(2x-1)}$ may be 10%, 11%, 12%, 13%, 14% or 15%, and a specific value between 10% and 15%. For the sake of the space and conciseness, the present disclosure does not enumerate the values endlessly.

In an exemplary embodiment, in the above $Ti_xO_{(2x-1)}$, x is not less than 5 and not more than 10, for example, x may be 5, 6, 7, 8, 9 or 10. For the sake of the space and conciseness, the present disclosure does not enumerate the values endlessly.

In an exemplary embodiment, the amount of the $TiO_2$ in the composite coating is of 5% to 10% expressed as a percent by mass based on the total mass of the composite coating. For example, the content of $TiO_2$ may be 5%, 6%, 7%, 8%, 9% or 10%, and a specific value between 5% and 10%. For the sake of the space and conciseness, the present disclosure does not enumerate the values endlessly.

In an exemplary embodiment, the substrate is a monometallic substrate. For example, the monometallic substrate may be made from copper or iron and the like, but is not only limited to this.

The present disclosure further provides a method for making the above sliding plate. The method includes the following steps: preparing a composite coating on a surface of a substrate through plasma spraying with Cu—$TiO_2$ core-shell composite powder; and mounting the substrate coated with the composite coating on a seat.

In the plasma spraying process, hydrogen plasma and hydrogen in a plasma fame flow chemically react with oxygen in $TiO_2$ (see formulas 1 and 2), to take away oxygen in a Ti—O bond, generate an oxygen vacancy, deoxidize $TiO_2$, and generate titanium suboxide ($Ti_4O_7$) having an anoxic phase, thereby obtaining the high-content $Ti_4O_7$ and then obtaining the composite coating on the surface of the substrate.

$$TiO_2 + H_2 \rightarrow Ti_4O_7 + H_2O \quad (1)$$

$$TiO_2 + H+ \rightarrow Ti_4O_7 + H_2O \quad (2)$$

Figure 2:
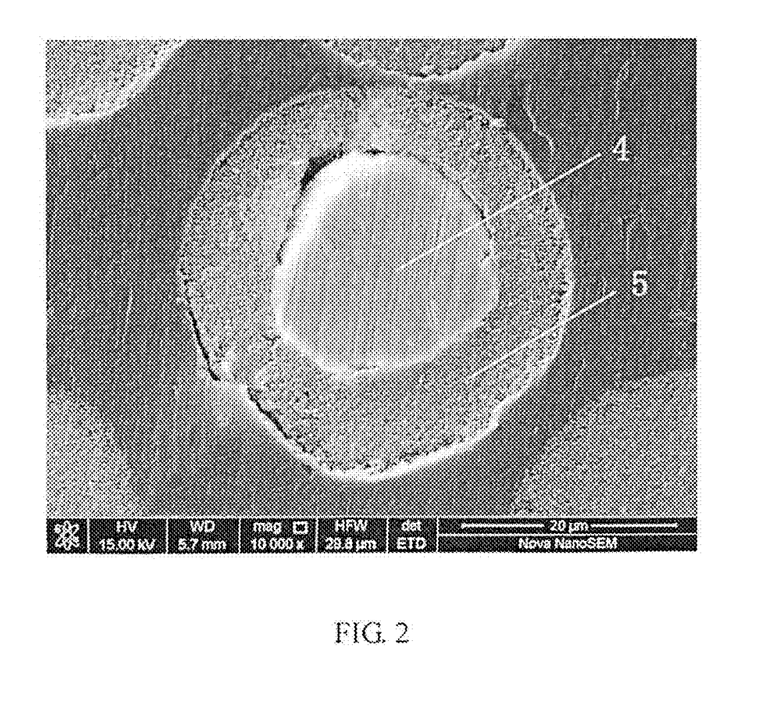
FIG. 2 is a scanning electron microscope diagram illustrating a Cu—$TiO_2$ composite powder in a core-shell structure.

The present disclosure also provides a method to prepare the Cu—$TiO_2$ composite powder in a core-shell structure. As shown in FIG. 2, Cu 4 in the Cu—$TiO_2$ composite powder is a core, and $TiO_2$ 5 coats Cu to form a shell. For the Cu—$TiO_2$ composite powder in the core-shell structure, Cu is coated by $TiO_2$ and is inside the powder, thereby effectively reducing the contact area of Cu and air, and inhibiting oxidation of Cu. In addition, $TiO_2$, as the shell, can fully contact with $H_2$ in a plasma jet and is deoxidized, thereby increasing the conversion efficiency of the titanium suboxide.

Optionally, the present disclosure prepares the Cu—$TiO_2$ composite powder in the core-shell structure with an ultrasonic dispersion and spray drying method, but is not limited to this. The method for preparing the Cu—$TiO_2$ composite powder in the core-shell structure includes: mixing 15%-25% of Cu powder and 75%-85% of $TiO_2$ powder by mass percent, and mixing and stirring the mixed powder with deionized water and a binder to obtain a mixed slurry; performing the ultrasonic dispersion on the mixed slurry to obtain an intermediate slurry; and performing spray granulation on the intermediate slurry to obtain the Cu—$TiO_2$ composite powder in the core-shell structure.

In the present disclosure, the size of the Cu powder is set to be 10-30 μm, such as 10 μm, 13 μm, 15 μm, 18 μm, 20 μm, 23 μm, 25 μm, 28 μm or 30 μm, and a specific value from 10 μm to 30 μm. For the sake of the space and conciseness, the present disclosure does not enumerate the values endlessly.

The particle size of the $TiO_2$ powder used in the present disclosure is at nano-level, and is generally within 1 nm-100 nm.

According to the present disclosure, the particle size of Cu—$TiO_2$ core-shell composite powder finally obtained is 25 μm-70 μm, for example, the particle size of Cu—$TiO_2$ core-shell composite powder may be 25 μm, 30 μm, 35 μm, 40 μm, 45 μm, 50 μm, 55 μm, 60 μm, 65 μm or 70 μm, and a specific value between 25 μm and 70 μm. For the sake of the space and conciseness, the present disclosure does not enumerate the values endlessly.

For the present disclosure, if the particle size of the composite powder is too small and the powder mass is light, burning loss, flying and other problems may be generated in the spraying process, causing that the powder feed is difficult and the deposition efficiency of the coating is poor. If the particle size of the powder is too large, it is difficult for a powder feeder to feed the powder and to speed up in the plasma jet, and the melting degree is insufficient, the deposition efficiency on the substrate is low, and the coating has many gaps and poor quality.

In an exemplary embodiment, by mass percent, the mixed slurry includes: 20%-40% of mixed powder, 60%-78% of deionized water, and 1%-3% of binder.

In an exemplary embodiment, the binder is polyvinyl alcohol.

In an exemplary embodiment, the ultrasonic dispersion is performed for 2.5-4 hours, the frequency is 40 Hz-60 Hz, and the temperature is 45° C.-60° C.

To reduce an agglomeration phenomenon of nano $TiO_2$ powder, in the present disclosure, anionic polycarboxylate electrolyte (SND 6800) that accounts for 0.1%-1% of total weight of the mixed slurry is added in the mixed slurry in the ultrasonic dispersion process.

The plasma spraying technology is a general technology. The present disclosure does not repeat the specific structure and mechanism of a plasma spraying device, and only limits key parameters that greatly influence the present disclosure.

The specific operation of the plasma spraying includes: conveying the Cu—$TiO_2$ core-shell composite powder to a nozzle of a plasma spraying device through a powder feeder, introducing working gas including Ar and $H_2$ into a reaction chamber of the plasma spraying device, controlling voltages and currents, enabling the hydrogen plasma and hydrogen in a plasma flame flow to chemically react with oxygen in $TiO_2$ to generate $Ti_4O_7$ using the temperature of plasma flame, and spraying $Ti_4O_7$ to the surface of the substrate to form a composite coating.

In an exemplary embodiment, a powder feed rate of the Cu—$TiO_2$ composite powder is 15 g/mm-30 g/mm, and for example, the powder feed rate may be 15 g/min, 17 g/min, 20 g/min, 23 g/min, 25 g/min, 27 g/min or 30 g/min, and a specific value between 15 g/mm and 30 g/mm. For the sake of the space and conciseness, the present disclosure does not enumerate the values endlessly.

In an exemplary embodiment, the content of $H_2$ in the working gas is 20-30% of that of Ar, and for example, the content of $H_2$ of that of Ar may be 20%, 21%, 22%, 23%, 24%, 25%, 26%, 27%, 28%, 29% or 30%, and a specific value between 20 and 30%. For the sake of the space and conciseness, the present disclosure does not enumerate the values endlessly.

For the present disclosure, the content of $H_2$ must be controlled within the above range. When the content of $H_2$ is too large, the erosion of the nozzle and the cathode may be serious, thereby reducing the service life of the spray gun. Moreover, $H_2$ has small ionization degree and high heat content, and the potential safety hazard is present if the content is too high. When the proportion of $H_2$ is too small, the deoxidization efficiency of $TiO_2$ may be reduced, and the generation of the titanium suboxide in the product may be reduced.

In an exemplary embodiment, the flow of Ar is 125 L/min-135 L/min, and for example, the flow of Ar may be 125 L/min, 126 L/min, 127 L/min, 128 L/min, 129 L/min, 130 L/min, 131 L/min, 132 L/min, 133 L/min, 134 L/min or 135 L/min, and a specific value between 125 L/min and 135 L/min. For the sake of the space and conciseness, the present disclosure does not enumerate the values endlessly.

When the flow of Ar is too high, the heating of powder is not facilitated, the powder is not molten uniformly, the spraying efficiency is reduced, the coating tissue is loosened, and the porosity is increased. When the flow of Ar is too low, the operating voltage of the spray gun may be reduced, the flame flow may be weak, and the erosion of the nozzle is easily caused.

In an exemplary embodiment, the flow of $H_2$ is 30 L/min-40 L/min, and for example, the flow of $H_2$ is could be 30 L/min, 31 L/min, 32 L/min, 33 L/min, 34 L/min, 35 L/min, 36 L/min, 37 L/min, 38 L/min or 39 L/min or 40 L/mm, and a specific value between 30 L/min and 40 L/min. For the sake of the space and conciseness, the present disclosure does not enumerate the values endlessly.

When the flow of Ar is too high or too low, a consequence brought is similar to that when the flow of $H_2$ is too high or too low, both of which do not facilitate the preparation of the composite coating and should be avoided as far as possible in the preparation process.

In an exemplary embodiment, during the plasma spraying, the voltage is 135 V-145V, and for example, the voltage may be 135V, 136V, 137V, 138V, 139V, 140V, 141V, 142V, 143V, 144V or 145V, and a specific value of the above-mentioned values between 135 V and 145V. For the sake of the space and conciseness, the present disclosure does not enumerate the values endlessly.

In an exemplary embodiment, during the plasma spraying, the current is 440 A-460 A, and for example, the current may be 440 A, 443 A, 445 A, 448 A, 450 A, 453 A, 455 A, 458 A or 460 A, and a specific value between 440 A and 460 A. For the sake of the space and conciseness, the present disclosure does not enumerate the values endlessly.

The above-mentioned voltage and the current are also important parameters in the preparation process, and a product of the voltage and the current is a spray power. When the spray power is too large, the spraying material may be gasified and the composition of the coating may be changed, and the steam condensation may cause poor bonding of the coating and also intensify the erosion of the nozzle and the electrode. When the spraying power is too small, the spraying particles are not heated enough, and the bonding strength, hardness and deposition efficiency of the coating are reduced.

According to the present disclosure, during the plasma spraying, a distance between the nozzle and the surface of the substrate is 70 mm-90 mm, and for example, the distance may be 70 mm, 73 mm, 75 mm, 78 mm, 80 mm, 83 mm, 85 mm, 88 mm or 90 mm, and a specific value between 70 mm and 90 mm. For the sake of the space and conciseness, the present disclosure does not enumerate the values endlessly.

When the distance between the nozzle and the surface of the substrate is too long, the powder which has been heated to a molten state is cooled, and the flying speed is reduced, thereby affecting the bonding of the coating and the substrate; and moreover, the spraying efficiency is reduced, and the porosity of the coating is increased. When the distance is too short, the powder may not be heated enough, thereby affecting the bonding strength, causing that the temperature of the substrate is too high and generating thermal deformation.

In the present disclosure, the surface of the substrate is pretreated before the plasma spraying. The pretreatment is as follows: performing ultrasonic cleaning on the surface of substrate with acetone to remove pollutants on the surface of the sliding plate; and then performing sand blasting on the cleaned surface, and forming a clean coarse surface on an external surface, thereby enhancing a mechanical bonding force between the molten spraying particles and the substrate surface and improving the bonding strength of the coating.

In the present disclosure, before mounting the substrate on the seat, the surface of the composite coating of the substrate is ground and polished. A thickness of the composite coating is reduced by 80-100 and the thickness of the ground and polished composite coating is 300-320 μm. Then, the substrate is mounted on the seat through a conductive adhesive.

Embodiment 1

Figure 5:
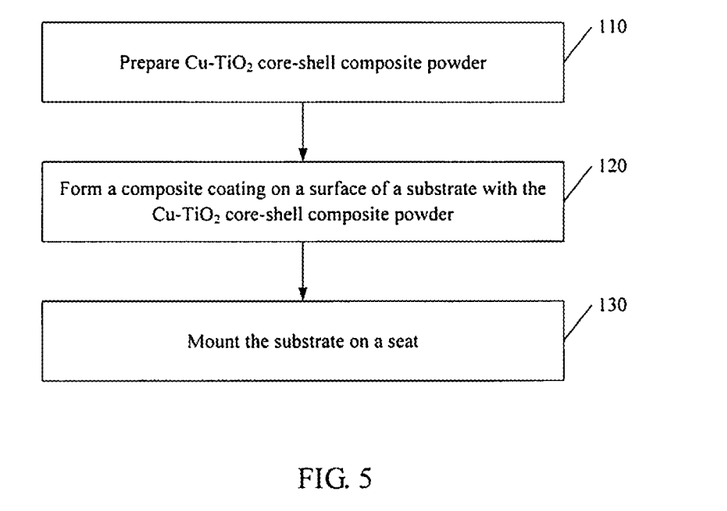
FIG. 5 is a flowchart of a method for making a sliding plate of a pantograph according to embodiment 1 of the present disclosure.

In step 110, Cu—$TiO_2$ composite powder is prepared with an ultrasonic dispersion and spray drying method. In one or more embodiments, step 110 includes steps 111 to 114.

In step 111, by mass percent, 20% of Cu powder with an average particle size of 15 μm is mixed with 80% of nano $TiO_2$ powder with an average particle size of 60 nm to obtain mixed powder.

In step 112, by mass percent, 30% of mixed powder, 68.5% of deionized water and 1.5% of binder (PVA) are mixed and stirred to obtain mixed slurry.

In step 113, the mixed slurry obtained in step 112 is placed in an ultrasonic reactor, and subjected to continuous ultrasonic dispersion for 3 h at a frequency of 45 Hz and a temperature of 50° C. During the ultrasonic dispersion, the dispersant SND 6800 that accounts for 0.5% of total weight of slurry is added in the slurry.

In step 114, the slurry obtained through the ultrasonic dispersion in step 113 is subjected to spray granulation using LGZ-25 centrifugal spray dryer. Selected spray drying parameters are shown in Table 1. The Cu—$TiO_2$ composite powder obtained after the spray granulation is in a core-shell structure.

TABLE 1

| Air inlet temperature | 230° C. | Slurry feed rate | 60 g/min |
|---|---|---|---|
| Air temperature in a cavity | 151° C. | Flow of atomizing air | 12 $m^3$/h |
| Air outlet temperature | 130° C. | Pressure of high-pressure air | 0.4 Mpa |
| Rotation speed of the nozzle | 13000 r/min | | |

In step 120, a composite coating is formed on the surface of a substrate by means of the plasma spraying. In one or more embodiments, step 120 includes steps 121 to 122.

In step 121, before the plasma spraying, the surface of the substrate is subjected to ultrasonic cleaning using acetone, and then the cleaned surface is subjected to sand blasting.

In step 122, the prepared Cu—$TiO_2$ core-shell composite powder is conveyed to a nozzle of a plasma spraying device through a powder feeder, with a powder feed rate of 20 g/min. Ar and $H_2$ are used as the working gas, and the content of $H_2$ is 30% of that of Ar. The flow of Ar is controlled at 130 L/min, and the flow of $H_2$ is controlled at 39 L/min. The voltage is adjusted to be 140V, the current is adjusted to be 450 A, and the spraying distance is 80 mm. The powder is heated to the molten state by virtue of the temperature of the plasma flame and is sprayed to the surface of the substrate at higher speed (the average speed is more than 340 m/s), and the composite coating is formed on the surface of the substrate.

In step 130, the obtained substrate coated by the composite coating is mounted on the seat.

According to a predetermined section size of the sliding plate, the surface of the composite coating is ground and polished to a specified roughness. In the polishing process, the thickness of the composite coating is reduced by about 80-100 μm, and the thickness of the composite coating finally obtained is 300-320 μm. Then the substrate is mounted on the seat via a conductive adhesive, and a sectional view of the assembled sliding plate is shown in FIG. 1.

Embodiment 2

Figure 6:
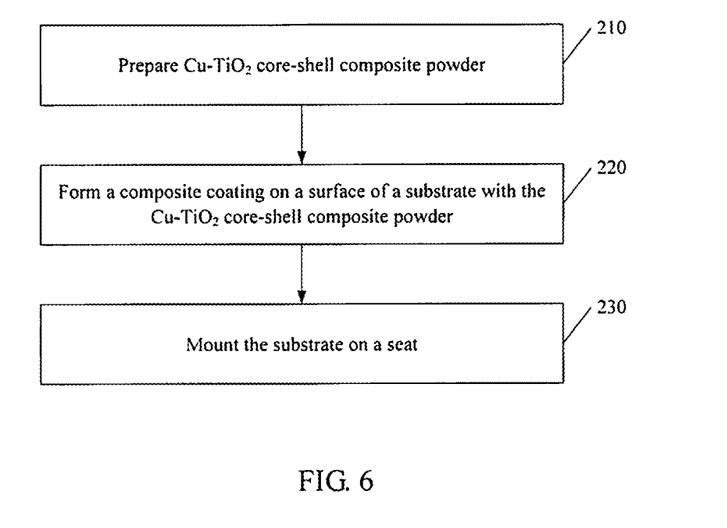
FIG. 6 is a flowchart of a method for making a sliding plate of a pantograph according to embodiment 2 of the present disclosure.

In step 210, Cu—$TiO_2$ composite powder is prepared by ultrasonic dispersion and spray drying. In one or more embodiments, step 210 includes steps 211 to 214.

In step 211, by mass percent, 23% of Cu powder with an average particle size of 15 μm is mixed with 77% of nano $TiO_2$ powder with an average particle size of 60 nm to obtain mixed powder.

In step 212, by mass percent, 33% of mixed powder, 65% of deionized water and 2% of binder (PVA) are mixed and stirred to obtain mixed slurry.

In step 213, the mixed slurry obtained in step 212 is placed in an ultrasonic reactor, and subjected to continuous ultrasonic dispersion for 3 h at a frequency of 45 Hz and a temperature of 50° C. In the ultrasonic dispersion process, the dispersant SND 6800 that accounts for 0.8% of total weight of slurry is added in the slurry;

In step 214, the slurry obtained through the ultrasonic dispersion in step 213 is subjected to spray granulation using LGZ-25 centrifugal spray dryer. The spray granulation is also performed according to the parameters shown in Table 1 of embodiment 1. The Cu—$TiO_2$ composite powder obtained after the spray granulation is in the core-shell structure.

In step 220, a composite coating is prepared on the surface of the substrate by means of the plasma spraying. In one or more embodiments, step 220 includes steps 221 to 222.

In step 221, before the plasma spraying, the surface of the substrate is subjected to ultrasonic cleaning using acetone, and then the cleaned surface is subjected to sand blasting.

In step 222, the prepared Cu—$TiO_2$ core-shell composite powder is conveyed to a nozzle of a plasma spraying device through a powder feeder, with a powder feed rate of 25 g/min. Ar and $H_2$ are used as the working gas, and the content of $H_2$ is 25% of that of Ar. The flow of Ar is controlled at 140 L/min, and the flow of $H_2$ is controlled at 35 L/min. The voltage is adjusted to be 135V, the current is adjusted to be 440 A, and the spraying distance is 85 mm. The powder is heated to a molten state by virtue of the temperature of the plasma flame and is sprayed to the surface of the substrate at higher speed (the average speed is more than 340 m/s), and the composite coating is formed on the surface of the substrate.

In step 230, the obtained substrate coated with the composite coating is mounted on the seat.

According to a predetermined section size of the sliding plate, the surface of the obtained composite coating is ground and polished to a specified roughness. In the polishing process, the thickness of the obtained composite coating is reduced by about 80-100 µm, and the thickness of the ground and polished composite coating is 300-320 µm. Then the substrate is mounted on the seat via a conductive adhesive.

Reference Example 1

Figure 7:
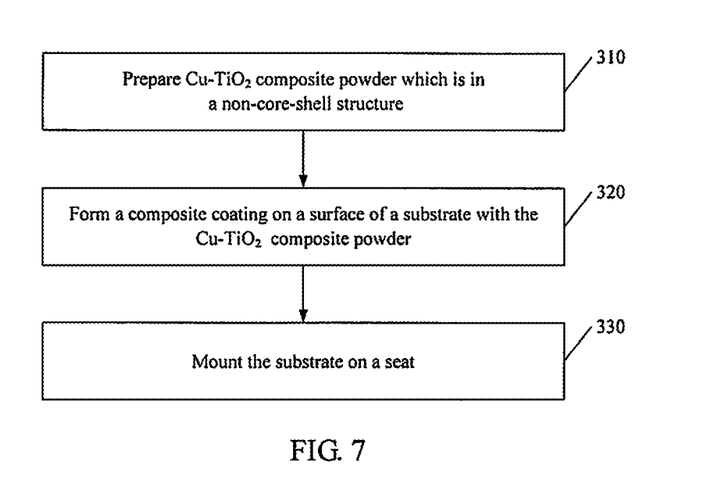
FIG. 7 is a flowchart of a method for making a sliding plate of a pantograph according to a reference example of the present disclosure.

In step 310, the Cu—$TiO_2$ composite powder is prepared. Step 310 may include steps 311 to 313.

In step 311, by mass percent, 20% of Cu powder with an average particle size of 15 µm is mixed with 80% of nano $TiO_2$ powder with an average particle size of 60 nm to obtain mixed powder.

In step 312, by mass percent, 30% of mixed powder, 68.5% of deionized water and 1.5% of binder (PVA) are mixed and stirred to obtain mixed slurry.

In step 313, the slurry obtained in step 312 is subjected to spray granulation using a LGZ-25 centrifugal spray dryer. The spray granulation is also performed according to the parameters shown in Table 1. The Cu—$TiO_2$ composite powder obtained through the spray granulation is in a non-core-shell structure.

Step 320 is same as step 120 of embodiment 1.
Step 330 is same as step 130 of embodiment 1.

In the coating obtained in this reference example, there exists more CuO, the content of $Ti_4O_7$ is insufficient and is only about 40%, while the content of $TiO_2$ is too high. The composite coating of the present disclosure cannot be obtained through this reference example 1.

Performance Test

The sliding plate obtained in embodiment 1 of the present disclosure and the sliding plate of a pantograph for high-speed railway that is purchased in the market are taken as specimens. The friction property of the coatings of the two specimens are tested using SRV-4® tribometer (produced by OPTIMOL Corporation in Germany) under the same condition. A ball-on-plate reciprocating friction test is adopted, and test is conducted in the atmospheric environment at a room temperature. In the test, a load is 20 N, a frequency is 20 Hz, a reciprocating stroke is 1.5 mm, and time is 60 min. A mating plate is a chromeplated ball with a diameter of 10 mm.

Meanwhile, a conventional method of the art is adopted to measure the resistivity of the sliding plates of the two specimens. The resistivity of the sliding plate obtained in embodiment 1 of the present disclosure is 5 µΩ·m, while the resistivity of the sliding plate purchased in the market is 10 µΩ·m.

Figure 3:
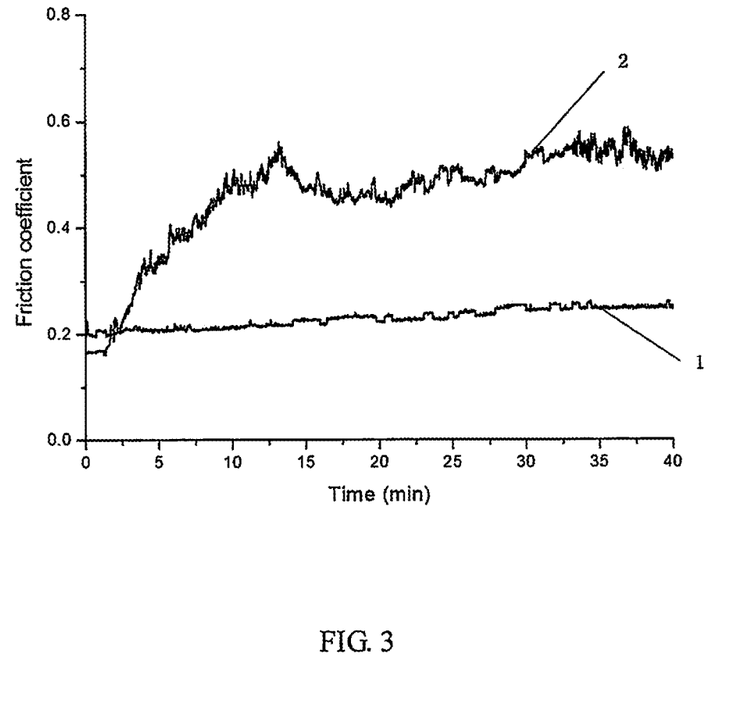
FIG. 3 is a graph illustrating a friction coefficient curve of a sliding plate prepared in embodiment 1 of the present disclosure and a friction coefficient curve of an existing sliding plate.

FIG. 3 is a graphic showing curves of relationships between friction coefficients of the coatings and the testing time. Curve 1 shows the relationship between the testing time and the friction coefficient of the coating of the sliding plate prepared in embodiment 1 of the present disclosure. Curve 2 shows the relationship between the testing time and the friction coefficient of the coating of a common sliding plate purchased in a market. As shown in FIG. 3, the friction coefficient of the sliding plate coated with the composite coating and obtained in embodiment 1 of the present disclosure is about 0.2, which is far lower than that of the common sliding plate purchased in the market. Moreover, the curve of the sliding plate of embodiment 1 is stable, which shows better wear resistance.

Figure 4:
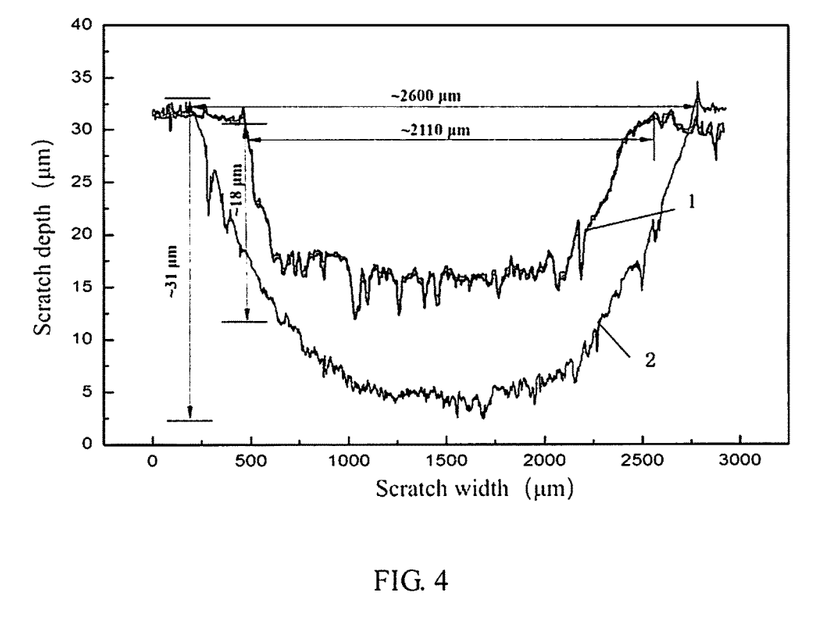
FIG. 4 is a graph illustrating a scratch depth curve of the sliding plate prepared in embodiment 1 of the present disclosure and a scratch depth curve of an existing sliding plate.

The worn amounts of the two sliding plates are assessed through the scratch depth and scratch width. In FIG. 4, axis X represents the scratch width, and axis Y represents the scratch depth. As shown in FIG. 4, under the same experimental condition, the wear depth and wear width of the sliding plate which is sprayed with the composite coating are far less than those of the common sliding plate, and the wearing amount of the sliding plate in embodiment 1 is about 50% of that of the common sliding plate.

A part of embodiments of the present disclosure are described in detail above. However, the present disclosure is not limited to specific details in above embodiments. Various simple variations of the technical solutions of the present disclosure can be made within a scope of a technical conception of the present disclosure, and these simple variations belong to the protection scope of the present invention.

In addition, it should be noted that, all specific technical features described in above specific embodiments could be combined in suitable manner in case of no contradiction. The present disclosure has various possible combination manners. To avoid unnecessary repetition, these possible combination manners will not be further described.

Furthermore, different embodiments of the present disclosure could also be arbitrarily combined, and should also be regarded as the content disclosed by the present disclosure as long as the combined embodiment is within the idea of the present disclosure.

What is claimed is:
1. A repairable sliding plate of a pantograph of an electronic locomotive, comprising:
   a seat;
   a substrate mounted on the seat;
   a Cu—$TinO2n-1$ composite coating formed on a surface of the substrate,
   wherein 4≤n≤10; and
   wherein the Cu—$TinO2n-1$ composite coating comprises the following components by mass percent: 60 wt %-70 wt % of Ti4O7, 15 wt %-25 wt % of Cu, 10 wt %-15 wt % of TixO2x−1 and 5 wt %-10 wt % of TiO2, and wherein 5≤x≤10.

2. The sliding plate according to claim 1, wherein the substrate is a monometallic substrate.

3. The sliding plate according to claim 2, wherein the monometallic substrate is made from copper.

4. A method for making the sliding plate according to claim 1, comprising:
preparing a composite coating on a surface of a substrate through plasma spraying with Cu—TiO2 core-shell composite powder; and
mounting the substrate coated with the composite coating on a seat.

5. The method according to claim 4, wherein the Cu—TiO2 core-shell composite powder is prepared by ultrasonic dispersion and spray drying according to the flowing steps:
mixing 15 wt %-25 wt % of Cu powder and 75 wt %-85 wt % of TiO2 powder to obtain mixed powder, and mixing and stirring the mixed powder, deionized water and a binder to obtain a mixed slurry;
performing an ultrasonic dispersion on the mixed slurry to obtain an intermediate slurry; and
performing a spray granulation on the intermediate slurry to obtain the Cu—TiO$_2$ core-shell composite powder.

6. The method according to claim 5, wherein, the mixed slurry comprises: 20 wt %-40 wt % of the mixed powder, 60 wt %-78 wt % of the deionized water, and 1 wt %-3 wt % of the binder.

7. The method according to claim 6, wherein the binder is polyvinyl alcohol.

8. The method according to claim 6, wherein the ultrasonic dispersion is performed for 2.5-4 hours, a frequency of the ultrasonic dispersion is 40 Hz-60 Hz, and a temperature of the ultrasonic dispersion is 45° C.-60° C.

9. The method according to claim 6, wherein anionic polycarboxylate electrolyte which accounts for 0.1%-1% of total weight of mixed slurry is added in the mixed slurry in the ultrasonic dispersion process.

10. The method according to claim 4, wherein the preparing a composite coating on a surface of a substrate through plasma spraying with Cu—TiO2 core-shell composite powder comprises:

conveying the Cu—TiO2 core-shell composite powder to a nozzle of a plasma spraying device through a powder feeder;
introducing working gas comprising Ar and H2 into a reaction chamber of the plasma spraying device; and
controlling a voltage and a current, enabling hydrogen plasma and hydrogen in a plasma flame flow to chemically react with oxygen in TiO2 to generate Ti4O7 using the temperature of plasma flame, and spraying the Ti4O7 to the surface of the substrate to form a composite coating.

11. The method according to claim 10, wherein a powder feed rate of the Cu—TiO2 composite powder 15 g/min-30 g/min.

12. The method according to claim 11, wherein the content of H2 in the working gas is 20%-30% of that of Ar.

13. The method according to claim 11, wherein the flow of Ar is 125 L/min-135 L/min, and the flow of H2 is 30 L/min-40 L/min.

14. The method according to claim 11, wherein in the plasma spraying, the voltage is 135V-145V, and the current is 440 A-460 A.

15. The method according to claim 11, wherein in the plasma spraying, a distance between the nozzle and the surface of substrate is 70 mm-90 mm.

16. The method according to claim 4, further comprising: performing a pretreatment on the surface of substrate before the preparing the composite coating, wherein the pretreatment comprises: performing an ultrasonic cleaning on the surface of substrate and performing a sand blasting on the cleaned surface of the substrate.

17. The method according to claim 16, wherein the ultrasonic cleaning is performed using acetone.

18. The method according to claim 4, further comprising: grinding and polishing a surface of the composite coating of the substrate before mounting the substrate coated with the composite coating on the seat, wherein the substrate coated with the composite coating is mounted on the seat via a conductive adhesive.

19. The method according to claim 18, wherein a thickness of the composite coating is reduced by 80 μm-100 μm by the grinding and polishing, and the thickness of the ground and polished composite coating is 300 μm-320 μm.

* * * * *